United States Patent [19]

Naemura et al.

[11] Patent Number: 4,699,498
[45] Date of Patent: Oct. 13, 1987

[54] IMAGE PROJECTOR WITH LIQUID CRYSTAL LIGHT SHUTTER

[75] Inventors: Shohei Naemura; Keiichi Kubota, both of Tokyo, Japan

[73] Assignee: NEC Corporation, Tokyo, Japan

[21] Appl. No.: 905,009

[22] Filed: Sep. 8, 1986

[30] Foreign Application Priority Data

Sep. 6, 1985 [JP] Japan ............................. 60-197911
Sep. 6, 1985 [JP] Japan ............................. 60-197912

[51] Int. Cl.$^4$ .................................... G03G 15/00
[52] U.S. Cl. ........................................ 355/3 R; 355/5; 383/122; 350/330
[58] Field of Search ............. 355/1, 3 R, 5, 71; 346/160; 358/296, 300; 340/765, 784, 794-796; 350/330, 331 R, 342

[56] References Cited

U.S. PATENT DOCUMENTS 4,563,059  1/1986  Clark et al. ..................... 350/330

FOREIGN PATENT DOCUMENTS 56-94377  7/1981  Japan ................................ 355/5

OTHER PUBLICATIONS

Dewey, Laser-Addressed Liquid Crystal Displays, 23, Optical Engineering, 230-240, No. 3, (May/Jun.) 1984.
Hong, Lipton, Bleha, Colles and Robusto, Application of Liquid Crystal Light Valve to a Large Screen Graphics Display, SID 79.
Umeda, Hori and Mukoh, Print Head with Ferroelectric Liquid-Crystal Light-Shutter Array, SID 85.
Clark and Lagerwall, Submicrosecond Bistable Electro-Optic Switching in Liquid Crystals, Appl. Phys. Lett., 899-901, No. 11, Jun. 1, 1980.
Kubota, Komatsubara, Imai, Kato, Naemura, Nishida and Sakaguchi, A Compact High Resolution Image Projector and Printer Using a Laser Addressed Liquid Crystal Light Valve, Institute of Electronics and Communication Engineers of Japan, 5-137, Mar. 27-30, 1985.
Grinberg, Jacobson, Bleha, Miller, Fraas, Boswell and Myer, A New Real-Time Non-Coherent to Coherent Light Image Converter the Hybrid Field Effect Liquid Crystal Light Valve, 14, Optical Engineering, 217-225, No. 3, May/Jun. 1975.

Primary Examiner—A. T. Grimley
Assistant Examiner—J. Pendegrass
Attorney, Agent, or Firm—Sughrue, Mion, Zinn, Macpeak & Seas

[57] ABSTRACT

In an improved image projector with liquid crystal light shutter, a layer of ferroelectric liquid crystals contained in a liquid crystal light shutter at which the light modulated linearly in accordance with image signals is produced is of the thickness of less than a helical pitch of molecules of the liquid crystals whereby a response time becomes as fast as, for instance, 0.18 ms and the time sharing operation can be performed in the liquid crystal light shutter.

3 Claims, 10 Drawing Figures

IMAGE PROJECTOR WITH LIQUID CRYSTAL LIGHT SHUTTER

FIELD OF THE INVENTION

The invention relates to an image projector with liquid crystal light shutter, and more particularly to an image projector with liquid crystal light shutter in which a liquid crystal light shutter is improved in regard to a response time thereof and has the characteristic of memory to allow the time sharing operation therein.

BACKGROUND OF THE INVENTION

One of conventional image projectors is described in "NATIONAL CONVENTION RECORD, 1985 of THE INSTITUTE OF ELECTRONICS AND COMMUNICATION ENGINEERS OF JAPAN". The image projector comprises a semiconductor laser head having two semiconductor lasers which produce light beams to be synthesized therein, first mirror for reflecting the light beams in a predetermined direction, a liquid crystal light valve (called "liquid crystal panel" hereinafter) in which a light transmissive pattern is formed in accordance with the scanning of the light beams on the one surface thereof, a halogen lamp from which light radiates to irradiate the other surface of the liquid crystal panel, second mirror for projecting the light reflected from the liquid crystal light panel on a screen, and a photoconductor drum to be exposed to the reflected light from the panel to produce a latent image thereon.

In operation, the light beams modulated by image signals are produced from the semiconductor laser head so that a light transmissive pattern is formed in the liquid crystal layer of the liquid crystal panel in accordance with the scanning of the modulated light beams on the scanning surface thereof by the first mirror. The liquid crystal panel is radiated on the one surface thereof so that light is reflected therefrom in accordance with the light transmissive pattern formed in the liquid crystal layer. As a result, the magnified image is displayed on the screen in accordance with the projecting of the reflected light from the panel by the second mirror. On the other hand, the photoconductor drum is exposed to the reflected light from the panel to produce a latent image thereon. The latent image thus formed is developed by use of toners. The developed toner image is transferred to a recording medium at a transferred stage. A printed image is obtained on the recording medium after finishing a fixed process at the fixed means.

According to an image projector mentioned above, the construction thereof is relatively simple as compared to, for instance, an image projector making use of a cathod ray tube (called "CRT" hereinafter) and an image having a higher resolution is produced as compared to, for instance, an image projector making use of CRT or matrix electrodes.

In the conventional image projector, however, the scanning of a liquid crystal panel is not performed at a high speed as expected because the liquid crystal panel is scanned by dots each corresponding to a picture element.

Further, one of conventional liquid crystal light shutters is described in "INTERNATIONAL SYMPOSIUM DIGEST of TECHNICAL PAPERS. Vol. XVI, 1985" in SOCIETY INFORMATION DISPLAY which was held on Apr. 30 to May 2, 1985 in Orlando, Fla. The liquid crystal light shutter which is applied to an electrophotographic recording apparatus including a photoconductor drum producing a latent image thereon comprises an upper glass substrate on which signal electrodes are provided, a lower glass substrate on which common electrode is provided, a liquid crystal layer positioned between the upper and lower glass substrates, and upper and lower polarizers provided on the other surfaces of the upper and lower glass substrates respectively. Liquid crystals for the liquid crystal layer are of ferroelectric liquid crystal material which shows a chiral smectic phase. In the chiral smectic phase, the liquid crystals have a helical structure and the molecules have spontaneous polarizations perpendicular to the axes thereof.

According to a liquid crystal light shutter mentioned above, a response time is improved as fast as 0.25 ms because the spontaneous polarizations align along upward and downward directions depending upon the two directions of electric fields each produced by positive and negative voltages applied between the respective signal electrodes and the common electrode. In addition, the printing speed is relatively high for the reason why the linearly modulated light is produced from the liquid crystal light shutter which is irradiated is exposed to te linearly modulated light to produce a latent image thereon.

In the conventional liquid crystal light shutter making use of ferroelectric liquid crystals showing a chiral smectic phase, however, a response time is difficult to be improved at the rate of less than 0.25 ms due to the limitation of the switching speed of the spontaneous polarizations thereof. Further, a circuit for driving signal electrodes in accordance with image signals is complicated for the reason why the signal electrode array of, for instance, 1024 picture elements must be driven simultaneously because the alignment of the spontaneous polarizations disappears upon the turning off of the voltage applied between the respective signal electrodes and the common electrode. Still further, it is required to apply a voltage as high as +30 V, or −30 V in accordance with the image signals to the signal electrodes in the liquid crystal light shutter.

SUMMARY OF THE INVENTION

Accordingly, it is an object of the invention to provide an image projector with liquid crystal light shutter in which a liquid crystal light shutter is improved at the rate of less than 0.25 ms in regard to a response time thereof.

It is a further object of the invention to provide an image projector with liquid crystal light shutter in which a liquid crystal light shutter has the characteristic of memory by which the alignment of spontaneous polarizations remains unchanged even after the turning off of the voltage applied between respective signal electrodes and a common electrode thereby allowing the time sharing operation therein.

It is still further object of the invention to provide an image projector with liquid crystal light shutter in which it is possible to decrease a voltage applied to signal electrodes in accordance with image signal down to, for instance, +12 V, or −12 V.

According to the invention, an image projector with liquid crystal light shutter comprises, a liquid crystal light shutter being composed of an array of signal electrodes to which higher or lower voltage is applied in regard to a common voltage in accordance with image signals, a common electrode to which the common voltage is applied, and a layer of ferroelectric liquid crystals showing a chiral smectic phase which is positioned between said array of the signal electrodes and said common electrode, a linear light source for irradiating said liquid crystal light shutter to produce the light modulated linearly by driving said signal electrodes in accordance with said image signals, a liquid crystal panel in which a light transmissive pattern is formed by the application of electric field due to the irradiation of light thereon, first means for reflecting the linearly modulated light produced at said liquid crystal shutter thereby scanning said liquid crystal panel on one surface thereof to form said light transmissive pattern therein, a light source for irradiating said liquid crystal panel on the other surface thereof to produce the light which is reflected from said liquid crystal panel in accordance with said light transmissive pattern therein, second means for reflecting the light reflected from said liquid crystal panel in a direction of displaying a projected image, and a screen for displaying said projected image by receiving the light reflected at said second means, wherein said layer of the ferroelectric liquid crystals in said liquid crystal light shutter is of the thickness of less than a helical pitch of molecules of said liquid crystals.

According to the invention, an image projector with liquid crystal light shutter further comprises electrophotographic recording apparatus including a photoconductor medium which is exposed to said linearly modulated light produced at said liquid crystal light shutter thereby producing a latent image thereon, and means for producing a printed image on a recording medium through developing, transferring, and fixing stages.

BRIEF DESCRIPTION OF THE DRAWINGS

The invention will be explained in detail in accordance with the following drawing wherein.

DESCRIPTION OF THE PREFERRED EMBODIMENT

Figure 1:
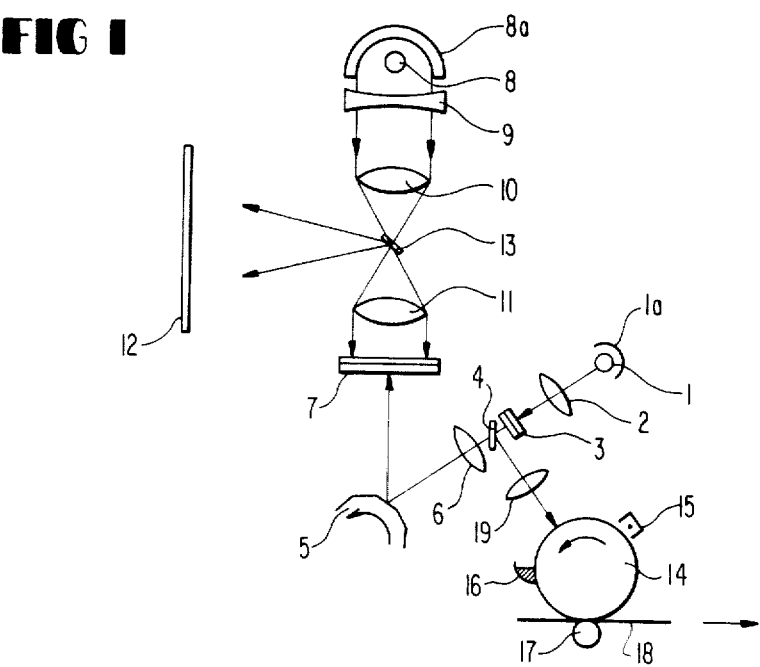
FIG. 1 is an explanatory view illustrating an image projector with liquid crystal light shutter in the embodiment according to the invention.

In FIG. 1, there is shown an image projector with liquid crystal light shutter in the embodiment according to the invention which comprises a linear lamp 1 from which light radiates in the direction of a lens 2 by means of a reflector 1a, a liquid crystal light shutter 3 producing light modulated linearly in accordance with image signals (described later in more detail), a dielectric half mirror 4 through which a portion of the linearly modulated light from the liquid crystal light shutter 3 passes and by which the other portion thereof is reflected in the direction perpendicular to the passing direction thereof, a polygon mirror 5 for reflecting the linearly modulated light which is focussed by a lens 6 after being passed through the half mirror 4, a liquid crystal light valve or panel 7 in which a light transmissive pattern is formed in accordance with the scanning of the linearly modulated light reflected at the polygon mirror 5 (described later in more detail), a projecting light source 8 of xenon lamp (500 W) from which light radiates in the direction of lenses 9, 10 and 11 by means of a reflector 8a to irradiate the liquid crystal panel 7, a screen 12 having a size of 1.5 m × 1.5 m for displaying an projected image thereon, a reflecting mirror 13 for reflecting the light reflected in accordance with the light transmissive pattern formed in the liquid crystal panel 7 in the direction of the screen 12, a photoconductor drum 14 which is exposed through a lens 19 to the light reflected at the half mirror 4 to produce a latent image thereon, a precharge corotoron 15 for charging the photoconductor drum 14 before the exposure stage, a developing means 16 for developing the latent image by use of toners, and a transfer means 17 for transferring the developed toner image from the photoconductor drum 14 to a recording medium 18.

Figure 2A:
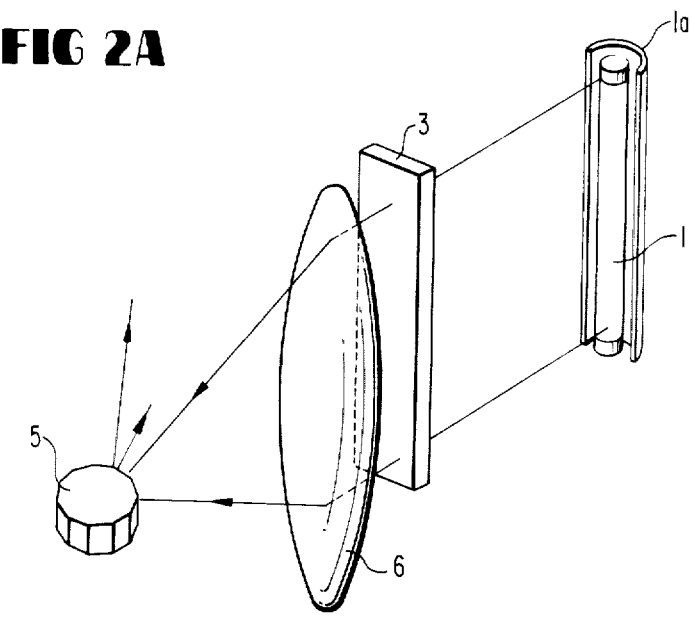
FIG. 2A is a perspective view illustrating a relation of a linear light source, a liquid crystal light shutter, and first reflecting mirror in the embodiment according to the invention.

In FIG. 2A, there is shown a relation of the linear lamp 1 having the reflector 1a, the liquid crystal light shutter 3, and the polygon mirror 5 in which the light radiating from the linear lamp 1 is modulated in accordance with the image signals at the liquid crystal light shutter 3 and focussed through the lens 6 on one of reflecting surfaces of the polygon mirror 5.

Figure 2B:
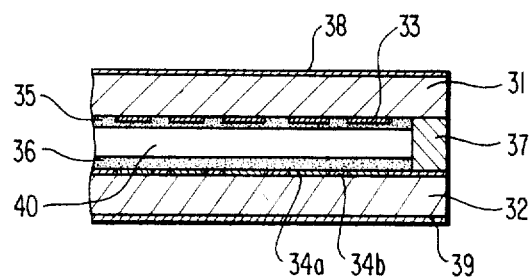
FIG. 2B is a cross sectional view illustrating a liquid crystal light shutter in the embodiment according to the invention.

In FIG. 2B, there is shown the liquid crystal light shutter 3 comprising a pair of glass substrates 31 and 32, array of transparent signal electrodes 33 provided on the inner surface of the glass substrate 31, a common electrode 34 including transparent electrode portions 34a and metal electrode portions (not transparent) 34b provided on the inner surface of the glass substrate 32, alignment layers 35 and 36 covering the signal electrodes 33 and the common electrode 34 respectively, spacer 37 positioned between the glass substrates 31 and 32, polarizers 38 and 39 provided on the respective outer surfaces of the glass substrates 31 and 32, and a layer 40 of ferroelectric liquid crystal material showing a chiral smectic phase contained between the alignment layers 35 and 36 (the glass substrates 31 and 32). In the liquid crystal light shutter 3, the layer 40 of ferroelectric liquid crystal material is of the thickness of, for instance, 2.5 μm, that is, less than a helical pitch of molecules of the liquid crystals. In general, the helical pitch is in the range of 3 μm to 10 μm. In the liquid crystal light shutter, a response time is improved to be as fast as 0.18 ms.

Figure 2C:
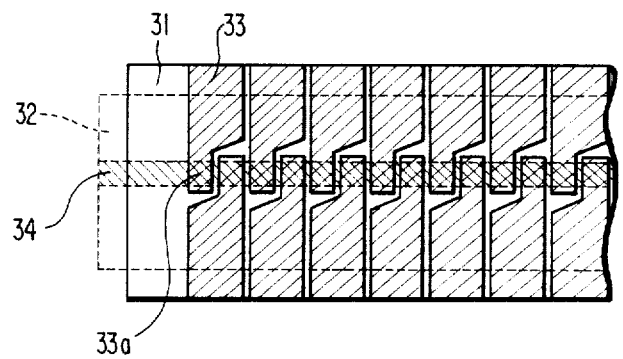
FIG. 2C is a plane view illustrating array of signal electrodes and a common electrode for a liquid crystal light shutter in the embodiment according to the invention.

In FIG. 2C, there is shown a relation of the transparent signal electrodes 33 provided on the inner surface of the glass substrate 31 and the common electrode 34 provided on the inner surface of the glass substrate 32. Each of the signal electrodes 33 is provided with a tip portion 33a corresponding to a picture element the density of which is 16 dots/mm. The common electrode 34 including the transparent electrode portions each corresponding in its position to the tip portion 33a of the signal electrode 33 and the metal electrode portions each corresponding in its position to the gap portion of the neighboring tip portions 33a thereof.

Figure 3A:
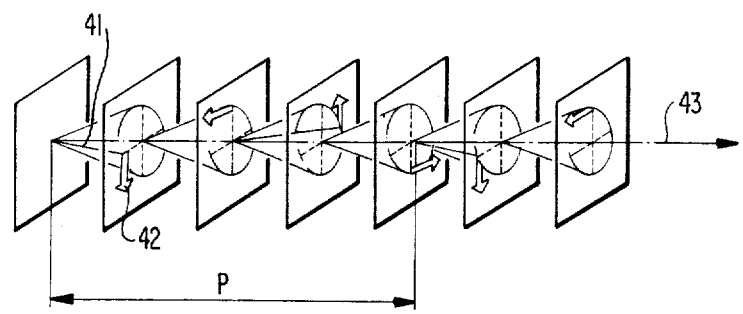
FIG. 3A is an explanatory view illustrating ferroelectric liquid crystals showing a chiral smectic phase used in a liquid crystal light shutter in the embodiment according to the invention.

In FIG. 3A, there is shown the chiral smectic phase of the ferroelectric liquid crystal material contained in the liquid crystal light shutter 3 mentioned above. The molecules of the liquid crystals are designated by reference numeral 4 and the spontaneous polarizations of the molecules 41 are designated by reference numeral 42. As clearly understood from the illustration therein, the liquid crystals include the molecules 41 having the spontaneous polarization 42 which represent a helical structure of a pitch P in the chiral smectic phase.

Figure 3B:
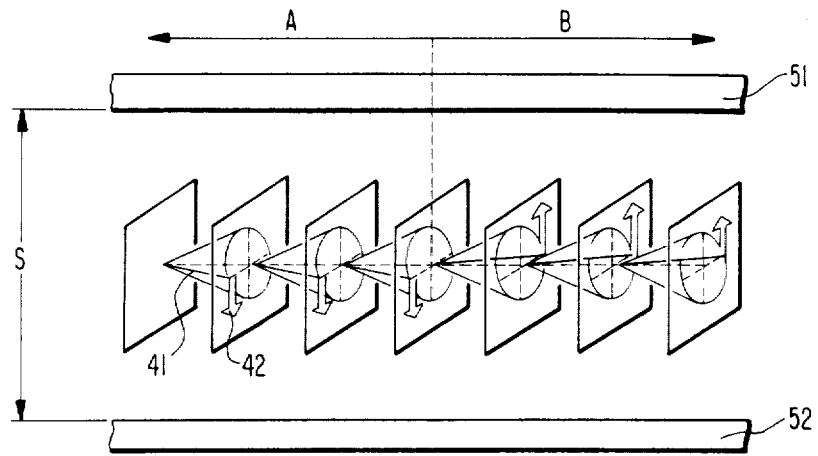
FIG. 3B is an explanatory view illustrating the alignment of spontaneous polarizations of molecules in liquid crystals for a liquid crystal light shutter in the embodiment according to the invention.

In FIG. 3B, there is shown a phenomenon in which the spontaneous polarizations 42 of the molecules 41 align along upward and downward directions in the chiral smectic phase of the ferroelectric liquid crystals in a case where the ferroelectric liquid crystals are confined between a pair of substrates 51 and 52 the facing space S of which is less than a helical pitch P mentioned above. As clearly shown therein, the spontaneous polarizations 42 of the molecules 41 are orientated downwardly in the region A while they are orientated upwardly in the region B.

Figure 3C:
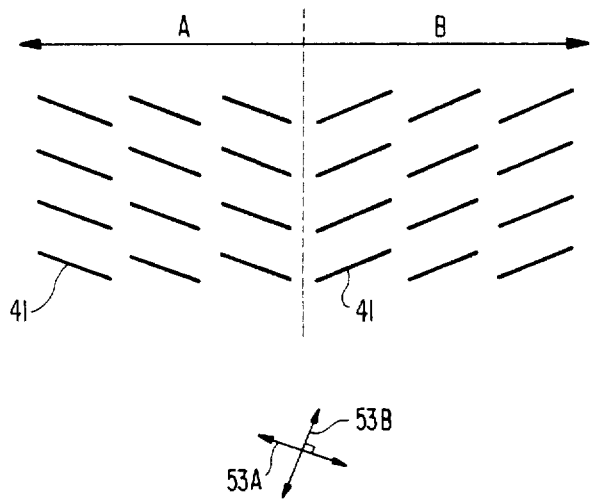
FIG. 3C is an explanatory view illustrating the orientation of molecules in liquid crystals for a liquid crystal light shutter in the embodiment according to the invention.

In FIG. 3C, there is shown the orientation of the molecules 41 as explained in FIG. 3B. In such an orientation of the molecules 41, the region A appears darkly while the region B appears brightly in a case where the ferroelectric liquid crystal material is sandwitched between a pair of polarizers (not shown) the facing space of which is less than the helical pitch P mentioned above and the polarized directions of which are perpendicular to one another as shown by 53A and 53B while one of the polarizer coincides in its polarization with the orientation of the molecules 41 in the region A. In such a case, the region B appears most brightly if the orientation of molecules 41 is angled with 45° in regard to the polarized directions 53A and 53B, that is, is positioned in the center of the both directions 53A and 53B.

Figure 4:
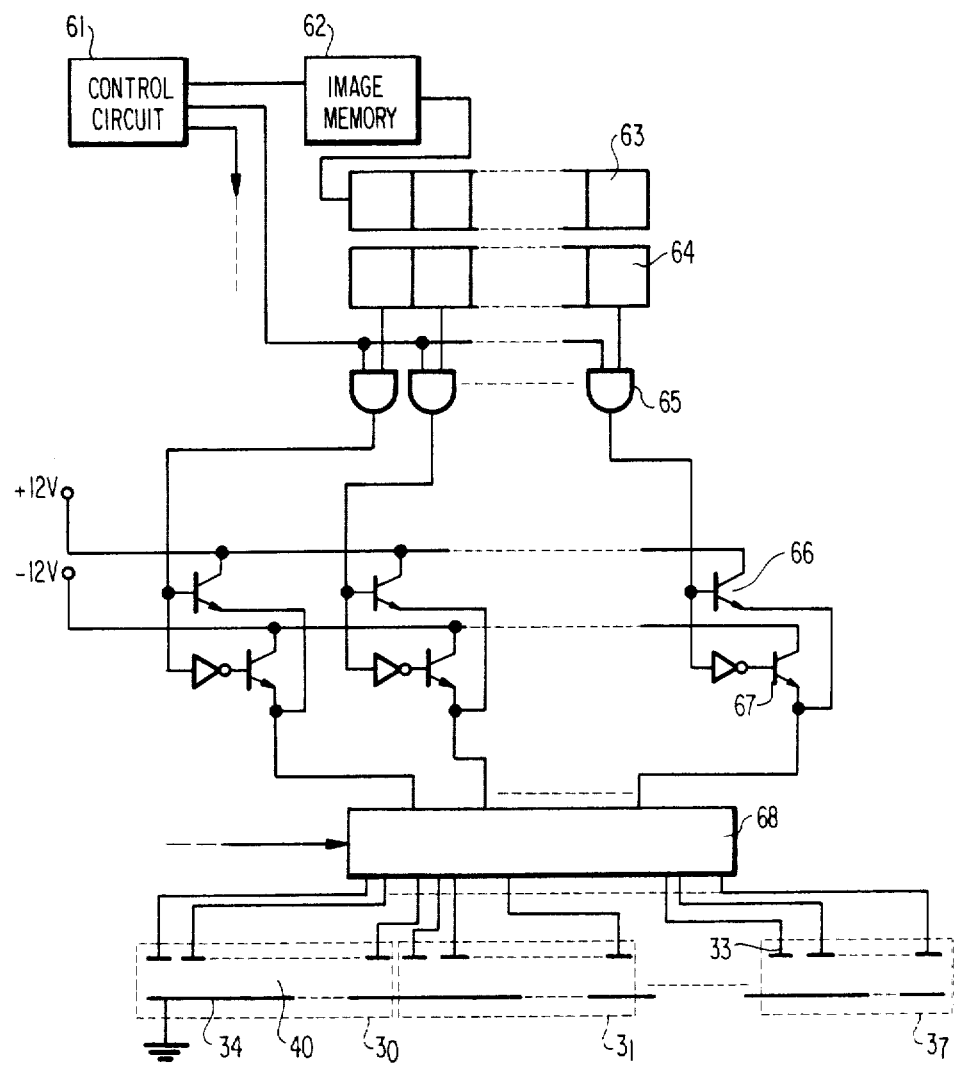
FIG. 4 is a block diagram illustrating a circuit for driving a liquid crystal light shutter in the embodiment according to the invention.

In FIG. 4, there is shown means for driving the liquid crystal light shutter 3 which comprises a control circuit 61 controlling the operation of the whole means, an image memory 62 storing image data, a shift register 63 of 128 bits storing image signals to be read from the image memory 62, a latch circuit 64 of 128 bits for latch of the image signals in the shift register 63, one hundred twenty eight AND gates 65 for passing the image signals in the latch circuit when control signal "1" is received from the control circuit 61, one hundred twenty eight transistors 66 for outputting positive voltage (+12 V) when the corresponding image signal is high "1", one hundred twenty eight transistors 67 for outputting negative voltage (−12 V) when the corresponding image signal is low "0", and a circuit 68 for distributing the positive and negative voltages in accordance with the image signals to the signal electrodes 33 of the liquid crystal light shutter 3 which are divided in groups $3_0$, $3_1$ . . . $-3_7$. In each group $3_0$, $3_1$ . . . $3_7$, 128 signal electrodes are assigned with the density of 16 dots/mm. The number of the signal electrodes 33 is 1024 so that the length of one scanning line is 64 mm.

Figure 5A:
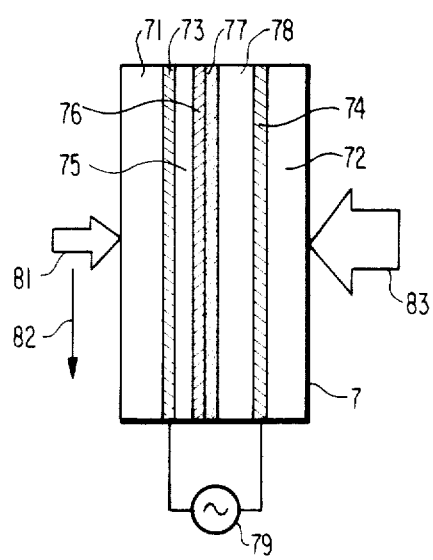
FIG. 5A is a cross sectional view illustrating a liquid crystal panel in the embodiment according to the invention.
Figure 5B:
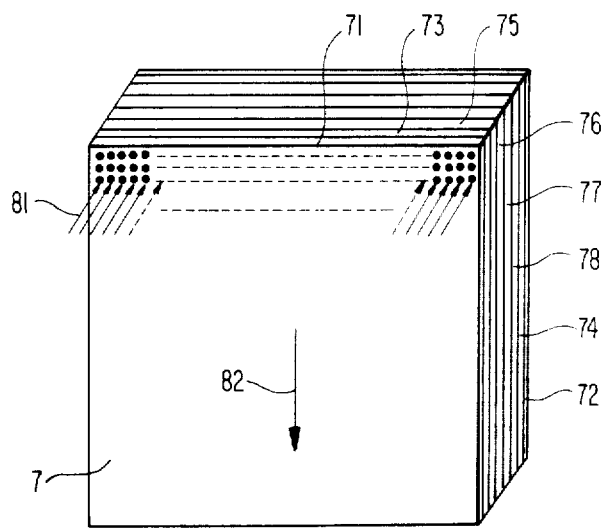
FIG. 5B is a perspective view illustrating a manner of scanning a liquid crystal panel in the embodiment according to the invention.

In FIGS. 5A and 5B, there is shown the liquid crystal panel 7 a response time of which is 30 ms and which comprises a pair of glass substrate 71 and 72, transparent electrodes 73 and 74 provided on the inner surfaces of the glass substrates 71 and 72 respectively, a photoconductor layer 76 of cadmium sulfide provided on the inner surface of the transparent electrode 73, a light shielding film 76 of cadmium tellurium provided on the inner surface of the photoconductor layer 75, a dielectric mirror 77 provided on the inner surface of the light shielding film 76, and a liquid crystal layer 78 of nematic liquid crystal material of twist nematic type which is known as functioning in hybrid field effect mode and contained in the facing space between the electrode 74 and the mirror 77. Polarizer is not shown herein although it is provided therein.

In operation, light radiates from the linear lamp 1 so that the liquid crystal light shutter 3 is irradiated by the light. On the other hand, image signals of 128 bits are read out of the image memory 62 and input into the shift register 63 and then latched at the latch circuit 64, when AND gates 65 are enabled by the control signal from the control circuit 61, the transistors 66 are turned on by the image signals "1" while the transistors 67 are turned on by the image signals "0" so that the positive and negative voltages (+12 V, −12 V) are output through the turned on transistors 66 and 67 in accordance with "1" or "0" of the 128 bit-image signals. At this stage, the positive and negative voltages are applied through the circuit 68 to the corresponding signal electrodes 33 in the first group 3. The time of driving the signal electrodes 33 is 4 μs per one picture element. At the next stage, the positive and negative voltages in accordance with the following 128 bit-image signals are applied through the circuit 68 to the corresponding signal electrodes 33 in the second group 3. In such a manner, the signal electrodes 33 in the first eighth groups $3_0$, $3_1$ . . . $3_7$ are driven in the time sharing operation. It takes 32 μs to finish driving the signal electrodes 33 of the eight groups $3_0$, $3_1$ . . . $3_7$. The ferroelectric liquid crystal material in the liquid crystal light shutter 3 is under the condition as shown in FIGS. 3B and 3C where the spontaneous polarizations 42 of molecules 41 align along upward and downward directions before being driven in accordance with the image signals while the spontaneous polarizations 42 of the molecules 41 take directions upwardly or downwardly depending solely upon whether the positive or negative voltage is applied to the corresponding signal electrodes 33 and their directions remain unchanged even after the turning off of the applied voltages to represent the characteristic of memory during the time sharing operation. As a result, the linearly modulated light is produced at the liquid crystal light shutter 3 and then reflected at the polygon mirror 5. The liquid crystal panel 7 is scanned at the back surface thereof from the upper line to the lower line (indicated by arrow 82) as shown in FIGS. 5A and 5B in accordance with the linearly modulated light 81 reflected by the polygon mirror 5. The number of the scanning line on the back surface of the panel 7 is 1024. Therefore, the photoconductor layer 75 of the liquid crystal panel 7 is exposed in accordance with the scanning of the linearly modulated light to produce a photoconductive pattern thereon so that the liquid crystal layer 78 therein is applied a predetermined voltage from an alternate power source 79 in accordance with the pattern. At the present moment, the liquid crystal panel 7 is irradiated by the light from the projecting light source 8 so that the light passes through the liquid crystal layer 78 in accordance with the voltage applied pattern, that is, the light transmissive pattern and reflected by the mirror 77 therein.

Finally, the light thus reflected by the liquid crystal panel 7 is reflected by the mirror 13 so that an image is displayed on the screen 12 with the brightness of 300 foot-lambert and the contrast of 5:1 in accordance with an image data in the image memory 62.

On the other hand, the photoconductor drum 14 is exposed, if instructed to do so by an operator, to the linearly modulated light reflected by the half mirror 4 after being charged by the precharge corotoron 15. An image is printed on the recording medium 18 through the steps of developing the latent image on the drum 14 by use of toners, transferring the developed toner image to the recording medium 18, and fixing the transferred image to the recording medium 18 by a heating means.

In the embodiment according to the invention mentioned above, the scanning length on the photoconductor layer 75 of the liquid crystal panel 7 is 64 mm and it takes 32 μs to scan one line thereon as mentioned before. The number of the scanning line on the panel 7 is 1024 so that 1024×1024 picture elements are written thereinto in a frame time of 33 ms.

Although the invention has been described with respect to specific embodiment for complete and clear disclosure, the appended claims are not to thus limited but are to be construed as embodying all modification and alternative construction that may occur to one skilled in the art which fairly fall within the basic teaching herein set forth.

What is claimed is:

1. An image projector with liquid crystal light shutter comprising, a liquid crystal light shutter being composed of an array of signal electrodes to which higher or lower voltage is applied in regard to a common voltage in accordance with image signals, a common electrode to which said common voltage is applied, and a layer of ferroelectric liquid crystals showing a chiral smectic phase which is positioned between said array of the signal electrodes and said common electrode, a linear light source for irradiating said liquid crystal light shutter to produce the light modulated linearly by driving said signal electrodes in accordance with said image signals, a liquid crystal light valve in which a light transmissive pattern is formed by the application of electric field due to the irradiation of light thereon, first means for reflecting the linearly modulated light produced at said liquid crystal shutter thereby scanning said liquid crystal light valve on one surface thereof to form said light transmissive pattern therein, a light source for irradiating said liquid crystal light valve on the other surface thereof to produce the light which is reflected from said liquid crystal light valve in accordance with said light transmissive pattern therein, second means for reflecting the light reflected from said liquid crystal light valve in a direction of displaying a projected image, and a screen for displaying said projected image by receiving the light reflected at said second means, wherein said layer of the ferroelectric liquid crystals in said liquid crystal light shutter is of the thickness of less than a helical pitch of molecules of said ferroelectric liquid crystals.

2. An image projector with liquid crystal light shutter according to claim 1, further comprising a circuit for driving said array of the signal electrodes in said liquid crystal light shutter in such a manner that said array of the signal electrodes is divided into a plurality of groups to be driven in the time sharing operation.

3. An image projector with liquid crystal light shutter according to claim 1, further comprising electrophotographic recording apparatus including a photoconductor medium which is exposed to said linearly modulated light produced at said liquid crystal light shutter thereby producing a latent image there on, and means for producing a printed image on a recording medium through developing, transferring, and fixing stages.

* * * * *

UNITED STATES PATENT AND TRADEMARK OFFICE
CERTIFICATE OF CORRECTION

PATENT NO. : 4,699,498

DATED : October 13, 1987

INVENTOR(S) : Shohei Naemura; Keiichi Kubota

It is certified that error appears in the above-identified patent and that said Letters Patent is hereby corrected as shown below:

Column 2, line 27, after "irradiated" insert --by a linear fluorescent lamp so that the photoconductor drum--.

Column 2, line 28, delete "te" and insert therefor --the--.

Column 6, line 9, delete "-$3_7$" and insert therefor --$3_7$--.

Column 6, line 18, delete "76" and insert therefor --75--.

Column 6, line 43, delete "3" and insert therefor --$3_0$--.

Column 6, line 48, delete "3" and insert therefor --$3_1$--.

Signed and Sealed this

Twenty-first Day of June, 1988

Attest:

DONALD J. QUIGG

Attesting Officer     Commissioner of Patents and Trademarks